United States Patent
Tamaki

(10) Patent No.: US 8,488,956 B2
(45) Date of Patent: Jul. 16, 2013

(54) FOCUS ADJUSTING APPARATUS AND FOCUS ADJUSTING METHOD

(75) Inventor: Yoshihito Tamaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 12/901,419

(22) Filed: Oct. 8, 2010

(65) Prior Publication Data

US 2011/0085786 A1    Apr. 14, 2011

(30) Foreign Application Priority Data

Oct. 13, 2009 (WO) .................. PCT/JP2009/067742

(51) Int. Cl.
    *G03B 3/00*    (2006.01)
(52) U.S. Cl.
    USPC ............................................ 396/104; 396/79
(58) Field of Classification Search
    USPC .................................................... 396/104, 79
    See application file for complete search history.

(56) References Cited

U.S. PATENT DOCUMENTS

| | | | |
|---|---|---|---|
| 5,367,153 A | 11/1994 | Suda | |
| 5,519,203 A * | 5/1996 | Kusaka et al. | 250/201.8 |
| 7,358,999 B2 | 4/2008 | Ikeda | |
| 7,474,352 B2 * | 1/2009 | Oikawa | 348/349 |
| 7,652,713 B2 | 1/2010 | Yamasaki | |
| 2002/0121652 A1 | 9/2002 | Yamasaki | |
| 2004/0207747 A1 | 10/2004 | Ikeda | |
| 2006/0197853 A1 * | 9/2006 | Miyashita | 348/241 |
| 2010/0214452 A1 * | 8/2010 | Kawarada | 348/255 |
| 2010/0245631 A1 * | 9/2010 | Hoda et al. | 348/241 |
| 2011/0019028 A1 * | 1/2011 | Kimijima et al. | 348/222.1 |

FOREIGN PATENT DOCUMENTS

| | | |
|---|---|---|
| JP | 4-267211 A | 9/1992 |
| JP | 5-127074 A | 5/1993 |
| JP | 6-102451 A | 4/1994 |
| JP | 06102451 A * | 4/1994 |
| JP | 11-258492 A | 9/1999 |
| JP | 2002-014277 A | 1/2002 |
| JP | 2002-118779 A | 4/2002 |
| JP | 2002-165126 A | 6/2002 |
| JP | 2007-121896 A | 5/2007 |

\* cited by examiner

*Primary Examiner* — W. B. Perkey
*Assistant Examiner* — Linda B Smith
(74) *Attorney, Agent, or Firm* — Canon U.S.A., Inc. IP Division

(57) ABSTRACT

High-accuracy focus adjustment is achieved even when vignetting is caused by a taking lens. A first pixel group receives a light beam that passes through a first pupil area of an optical system that forms an object image, and a second pixel group receives a light beam that passes through a second pupil area. A first signal based on an output signal from the first pixel group and a second signal based on an output signal from the second pixel group are corrected using correction information with a sampling pitch that is changed in accordance with an amount of defocus. A focal state of the optical system is adjusted based on an amount of relative displacement between the corrected first signal and the corrected second signal after the image-signal correction process.

18 Claims, 16 Drawing Sheets

Obj

LSFAx

LSFBx

ImgA

ImgB

ReImgA

ReImgB

FIG. 11A
FIG. 11B
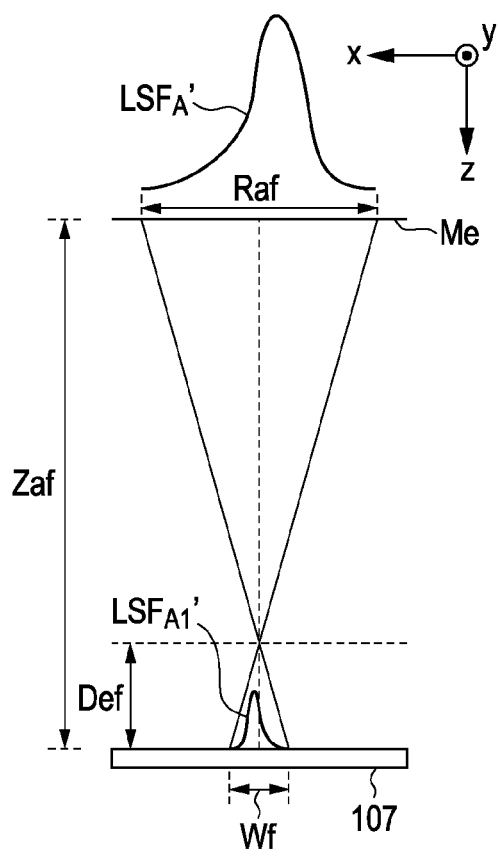
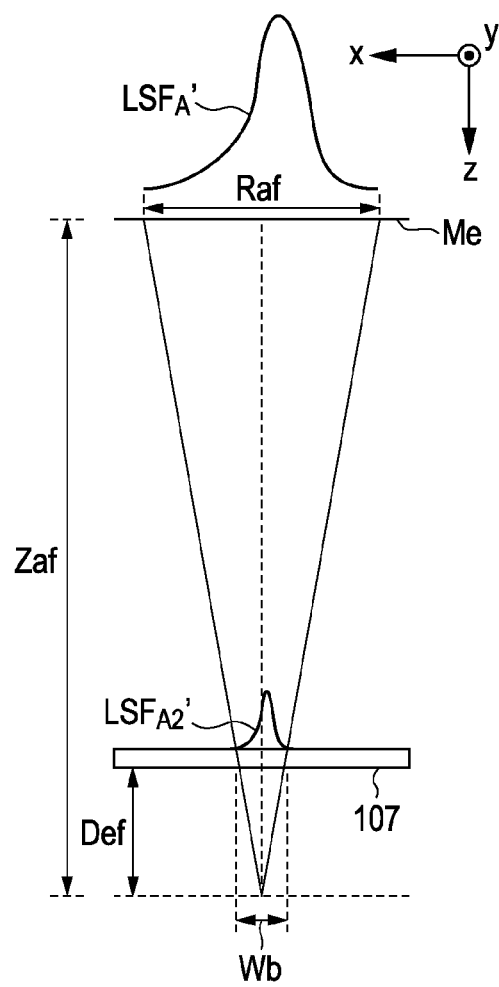

FOCUS ADJUSTING APPARATUS AND FOCUS ADJUSTING METHOD

TECHNICAL FIELD

The present invention relates to a focus adjusting apparatus and a focus adjusting method, and more particularly, to an auto-focusing system for use in, for example, an electronic camera.

BACKGROUND ART

Japanese Patent Laid-Open No. 4-267211 discloses a solid-state image pickup device which functions as an image pickup element and in which pixels are two-dimensionally arranged. The pixels include microlenses and photoelectric conversion units that are relatively displaced from each other. In the solid-state image pickup device according to Japanese Patent Laid-Open No. 4-267211, in a normal image-capturing operation, an image is formed by adding signals from pixels for which directions of relative displacements between the microlenses and the photoelectric conversion units are different from each other. In an operation of calculating a focus position of a taking lens, the focus position of the taking lens is calculated on the basis of a pair of images obtained by pixel columns for which directions of relative displacements between the microlenses and the photoelectric conversion units are different from each other. The focus position of the taking lens is calculated by performing a correlation calculation based on an amount of relative displacement between the pair of images.

In the case where the focus position is calculated in a phase-difference AF (Auto Focus) mode while vignetting is caused by the taking lens, asymmetry of image signals (reduction in the degree of coincidence of the images) is caused by the vignetting due to the taking lens. Accordingly, Japanese Patent Laid-Open No. 5-127074 discloses a technique in which a specific image correction filter is stored in an image pickup device and is deformed on the basis of an aperture ratio, the position of an exit pupil, and an amount of defocus. According to this technique, the image correction filter is applied to the image signals, and then the focus position is calculated. The image correction filter is applied to the image signals by convolution integration. Therefore, the pitch of the image correction filter is set to be equal to the pitch of the image signals.

In the technique of the related art, the pitch of the image correction filter is constant irrespective of the amount of defocus or an F-number. Therefore, in an area near the in-focus position, where a filter length is small, a correct filter shape cannot be obtained because of, for example, aliasing distortion, and accordingly the focus calculation accuracy is reduced.

An object of the present invention is to achieve high-accuracy focus adjustment even when vignetting is caused by a taking lens.

SUMMARY OF INVENTION

According to an aspect of the present invention, a method for an apparatus including image pickup unit that includes a first pixel group and a second pixel group, the first pixel group receiving a light beam that passes through a first pupil area of an optical system that forms an object image and the second pixel group receiving a light beam that passes through a second pupil area, includes correcting a first signal based on an output signal from the first pixel group and a second image signal based on an output signal from the second pixel group using correction information with a sampling pitch corresponding to an amount of defocus determined by an amount of relative image displacement between the first signal and the second signal; and performing a control for adjusting a focal state of the optical system based on an amount of defocus and a corrected second signal obtained as a result of the correction performed in the correcting the first signal.

Further features of the present invention will become apparent from the following description of exemplary embodiments with reference to the attached drawings.

BRIEF DESCRIPTION OF DRAWINGS

FIGS. 11A and 11B are conceptual diagrams illustrating light rays incident on the image pickup element in a defocused state.

DESCRIPTION OF EMBODIMENTS

Embodiments of the present invention will now be described with reference to the drawings.

First Embodiment

A first embodiment of the present invention will be described with reference FIGS. 1 to 14C.
(Structure of Image Pickup Device)

Figure 1:
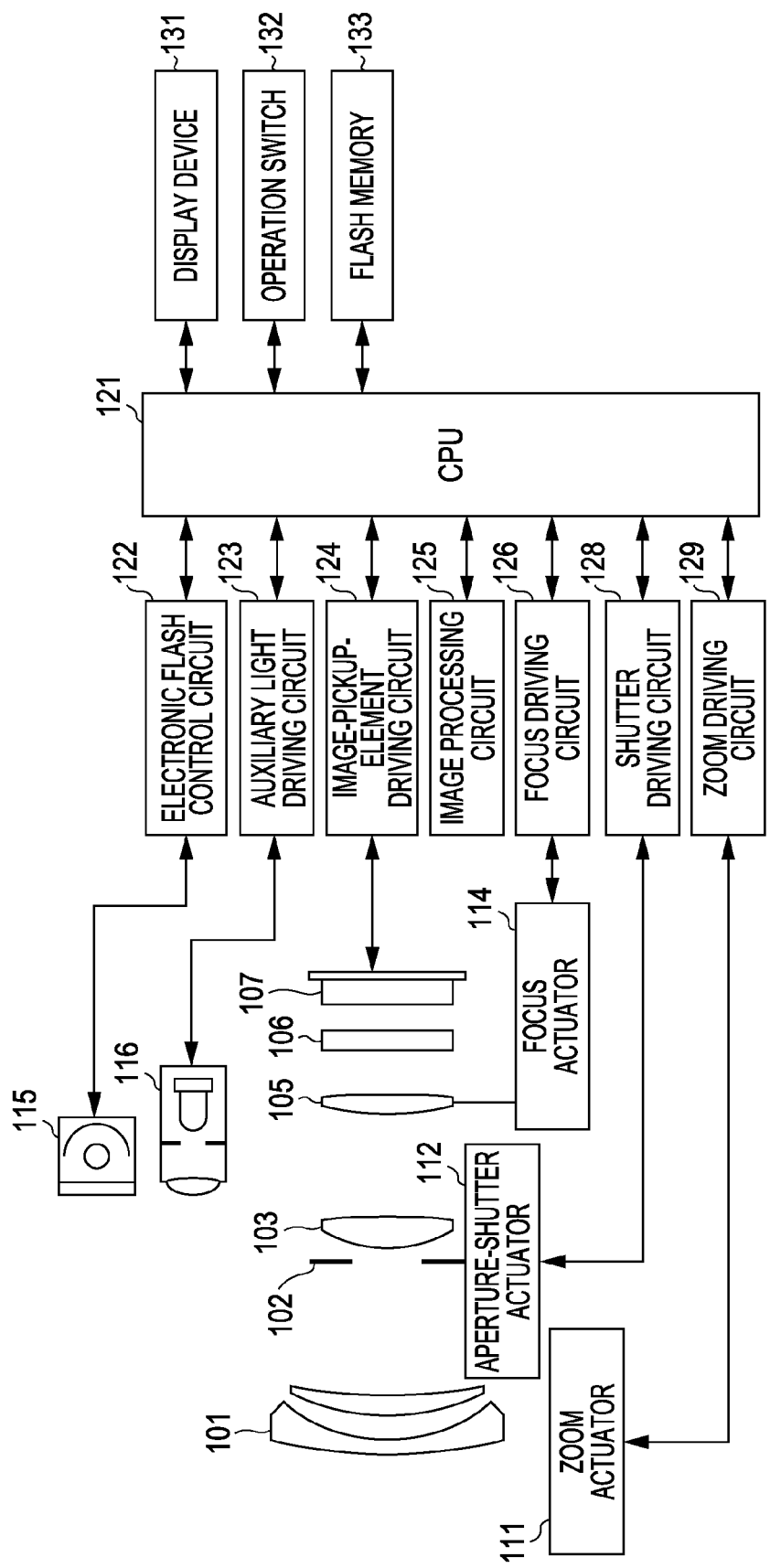
FIG. 1 is a block diagram of an image pickup device.

FIG. 1 is a block diagram of an image pickup device according to the present embodiment. In FIG. 1, reference numeral 101 denotes a first lens unit that is arranged at an end of a taking lens (imaging optical system) and that is held so as to be movable back and forth in an optical axis direction.

Reference numeral 102 denotes an aperture-shutter that adjusts an amount of light in a shooting operation by adjusting the aperture diameter of the aperture-shutter and that also functions as a shutter for adjusting an exposure time in an operation of capturing a still image. Reference numeral 103 denotes a second lens unit included in the taking lens. The aperture-shutter 102 and the second lens unit 103 move together back and forth in the optical axis direction to provide a magnification-varying function (zooming function) in cooperation with the back-and-forth movement of the first lens unit 101.

Reference numeral 105 denotes a third lens unit included in the taking lens, and performs focus adjustment by moving back and forth in the optical axis direction. Reference numeral 106 denotes an optical low-pass filter, which is an optical element for reducing false color and moire in the captured image. Reference numeral 107 denotes an image pickup element including a C-MOS sensor and peripheral circuits for the C-MOS sensor. The image pickup element is a two-dimensional single-plate color sensor in which an on-chip primary color mosaic filter having a Bayer pattern is formed on a light-receiving pixel array including m pixels in the horizontal direction and n pixels in the vertical direction.

Reference numeral 111 denotes a zoom actuator that moves the components from the first lens group 101 to the second lens unit 103 back and forth in the optical axis direction by rotating a cam cylinder (not shown), and thereby performs a magnification-varying process. Reference numeral 112 denotes an aperture-shutter actuator that adjusts an amount of imaging light by controlling the aperture diameter of the aperture-shutter 102 and that also performs exposure time control in the operation of capturing a still image. Reference numeral 114 denotes a focus actuator that performs focus adjustment by moving the third lens unit 105 back and forth in the optical axis direction.

Reference numeral 115 denotes an electronic flash for illuminating an object in the shooting operation. A photoflash device using a xenon tube is preferably used as the electronic flash. However, an illumination device including a continuous emission LED may instead be used. Reference numeral 116 denotes an AF auxiliary light unit that projects an image of a mask having a predetermined opening pattern onto an object field through a transmitter lens to increase the focus calculation performance for an object in a dark environment or a low-contrast object.

Reference numeral 121 denotes a CPU that controls various operations of the image pickup device. The CPU 121 includes a calculation unit, a ROM, a RAM, an A/D converter, a D/A converter, a communication interface circuit, etc., and drives various circuits included in the image pickup device on the basis of predetermined programs stored in the ROM. Thus, the CPU 121 performs a sequence of operations including AF, shooting, image processing, and recording.

Reference numeral 122 denotes an electronic flash control circuit that turns on the illumination unit 115 in synchronization with the shooting operation. Reference numeral 123 denotes an auxiliary light driving circuit that turns on the AF auxiliary light unit 116 in synchronization with the focus calculation operation. Reference numeral 124 denotes an image-pickup-element driving circuit that controls the image pickup operation performed by the image pickup element 107 and transmits image signals obtained by the image pickup operation to the CPU 121 after subjecting the image signals to A/D conversion. Reference numeral 125 denotes an image processing circuit that performs processes such as γ-conversion, color interpolation, and JPEG compression of the image captured by the image pickup element 107.

Reference numeral 126 denotes a focus driving circuit that controls the focus actuator 114 on the basis of the result of the focus calculation operation to perform focus adjustment by moving the third lens unit 105 back and forth in the optical axis direction. Reference numeral 128 denotes a shutter driving circuit that controls the aperture-shutter actuator 112 to adjust the aperture of the aperture-shutter 102. Reference numeral 129 denotes a zoom driving circuit that drives the zoom actuator 111 in accordance with a zoom operation performed by a user.

Reference numeral 131 denotes a display device, such as an LCD, that displays information regarding a shooting mode of the image pickup device. The display device 131 also displays a preview image before the shooting operation, a confirmation image after the shooting operation, and an in-focus state display image during the focus calculation operation. Reference numeral 132 denotes an operation switch group including a power switch, a release (shooting trigger) switch, a zoom operation switch, and a shooting-mode selection switch. Reference numeral 133 denotes a detachable flash memory that stores captured images.

(Structure of Image Pickup Pixels)

Figure 2A:
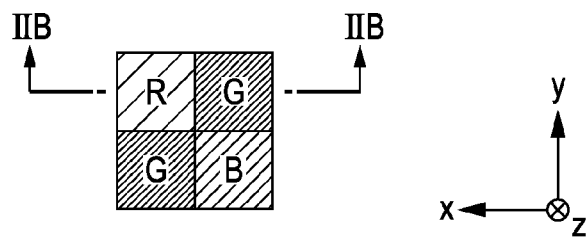
FIGS. 2A and 2B are diagrams illustrating image pickup pixels.
Figure 2B:
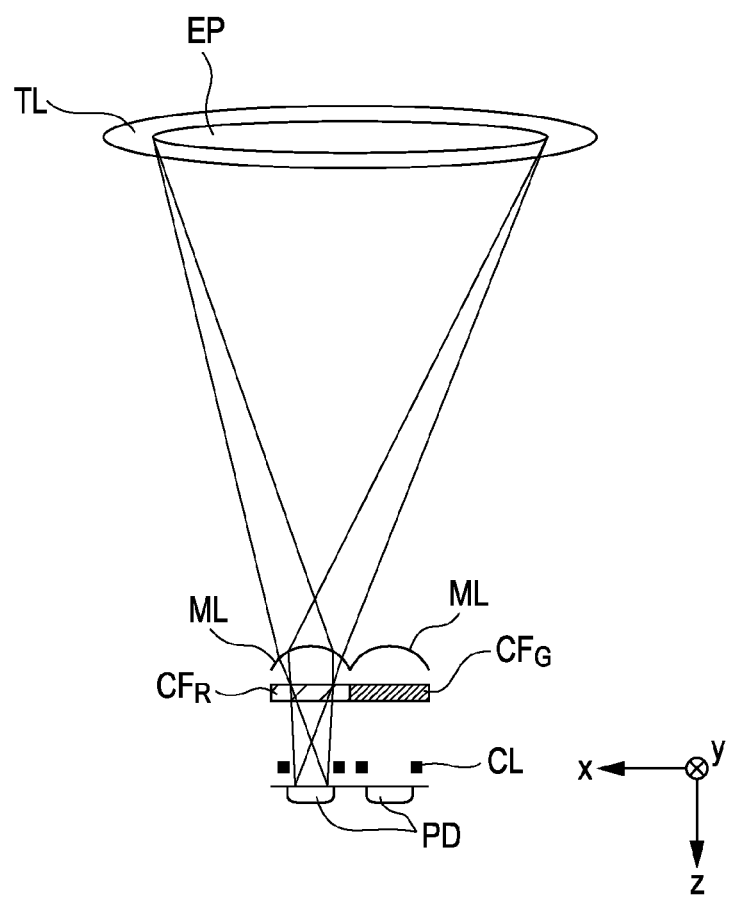

FIGS. 2A and 2B are diagrams illustrating the structure of image pickup pixels. FIGS. 2A and 2B are an enlarged plan view and an enlarged sectional view, respectively, of the image pickup pixels. In the present embodiment, in a pixel array of four pixels (two rows and two columns), image pickup pixels (G pixels) having spectral sensitivity for G (Green) light are arranged at two diagonal positions. In addition, an image pickup pixel (R pixel) having spectral sensitivity for R (Red) light and an image pickup pixel (B pixel) having spectral sensitivity for B (Blue) light are arranged at the remaining two positions. In other words, the Bayer pattern is used in the present embodiment. Focus detection pixels, the structure of which will be described below, are distributed under a predetermined rule among the pixels having the Bayer pattern.

FIG. 2A is a plan view of the image pickup pixels arranged in two rows and two columns at a central area of the image pickup element. In the Bayer pattern, the G pixels are arranged at the diagonal positions, and the R pixel and the B pixel are arranged at the remaining two positions. The structure including the two rows and two columns is periodically arranged.

FIG. 2B is a sectional view of FIG. 2A taken along line IIB-IIB. Reference sign ML denotes on-chip microlenses arranged at the foremost positions in each image pickup pixel, CFR denotes a R (Red) color filter, and CFG denotes a G (Green) color filter. Reference sign PD denotes photoelectric conversion units included in the C-MOS sensor, and CL denotes a wiring layer in which signal lines for transmitting various signals in the C-MOS sensor are formed. Reference sign TL denotes a taking lens.

In the image pickup pixels, the on-chip microlenses ML and the photoelectric conversion units PD are structured such that a light beam that passes through the taking lens TL can be received as effectively as possible. In other words, an exit pupil EP (also referred to as a pupil area) of the taking lens TL and each photoelectric conversion unit PD are in a conjugate relationship through the corresponding microlens ML, and each photoelectric conversion unit is designed to have a large effective area. Although the light beam incident on the R pixel is illustrated in FIG. 2B, the G pixel and the B pixel also have a similar structure. Therefore, the exit pupil EP corresponding to each of the R, G, and B image pickup pixels has a large diameter, and the light beam from the object can be effectively received, so that the S/N ratio of the image signals is increased.

(Structure of Focus Detection Pixels)

Figure 3A:
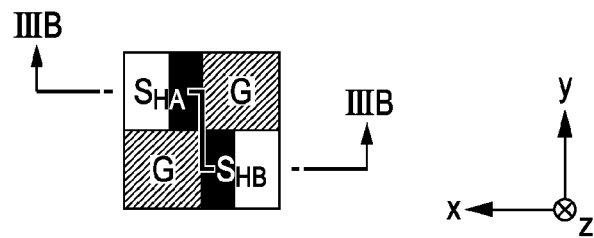
FIGS. 3A and 3B are diagrams illustrating focus detection pixels.
Figure 3B:
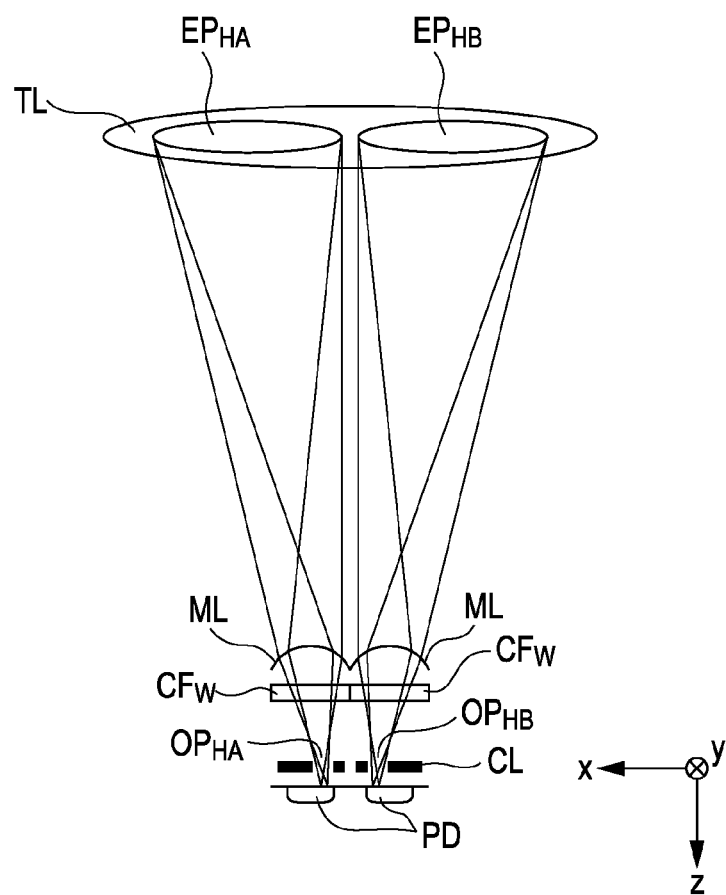

FIGS. 3A and 3B are diagrams illustrating the structure of focus detection pixels. FIGS. 3A and 3B are an enlarged plan view and an enlarged sectional view, respectively, of the focus detection pixels for dividing the pupil of the taking lens TL in an x direction illustrated in FIG. 3B. FIG. 3A is a plan view of pixels arranged in two rows and two columns including the focus detection pixels at a central area of the image pickup element. In general, image recognition characteristics of human observers are sensitive to illumination information. Therefore, if G pixels are lost when the image signals are acquired, the image degradation is easily noticeable. Thus, the G pixels acquire the main part of the illumination information. In contrast, R pixels and B pixels are image pickup pixels that acquire color information, and human observers are insensitive to color information. Therefore, even when some R pixels or B pixels, which acquire color information, are lost, the image degradation is not easily noticeable. Therefore, in the present embodiment, in the arrays of image pickup pixels arranged in two rows and two columns, the focus detection pixels are provided at a certain percentage in place of the image pickup pixels at positions corresponding to the R pixels and B pixels, while leaving the image pickup pixels that serve as the G pixels. The thus-provided focus detection pixels are denoted by SHA and SHB in FIG. 3A.

FIG. 3B is a sectional view of FIG. 3A taken along line IIIB-IIIB. The microlenses ML and the photoelectric conversion units PD have the same structures as those in the image pickup pixels illustrated in FIG. 2B. In the present embodiment, signals obtained by the focus detection pixels are not used to form an image. Therefore, transparent films CFW (White) are provided in place of the color separation filters. To divide the pupil at the image pickup element, openings formed in the wiring layer CL are biased along the x direction with respect to the center lines of the microlenses ML. More specifically, an opening OPHA in the focus detection pixel SHA is biased in the −x direction, and therefore the focus detection pixel SHA receives a light beam that passes through an exit pupil area EPHA at the left side of the taking lens TL in FIG. 3B. Similarly, an opening OPHB in the pixel SHB is biased in the +x direction, and therefore the pixel SHB receives a light beam that passes through an exit pupil area EPHB at the right side of the taking lens TL in FIG. 3B. A plurality of the focus detection pixels SHA are regularly arranged along the x direction, and a first image signal obtained by the focus detection pixels SHA is defined as an image signal A. In addition, a plurality of the focus detection pixels SHB are also regularly arranged along the x direction, and a second image signal obtained by the focus detection pixels SHB is defined as an image signal B. The focus position of the taking lens can be determined from an amount of defocus calculated by performing a correlation calculation based on an amount of relative image displacement between the image signal A and the image signal B. Therefore, the focal state of the taking lens can be adjusted on the basis of the focus position.

(Concept of Pupil Dividing State at Image Pickup Element)

Figure 4:
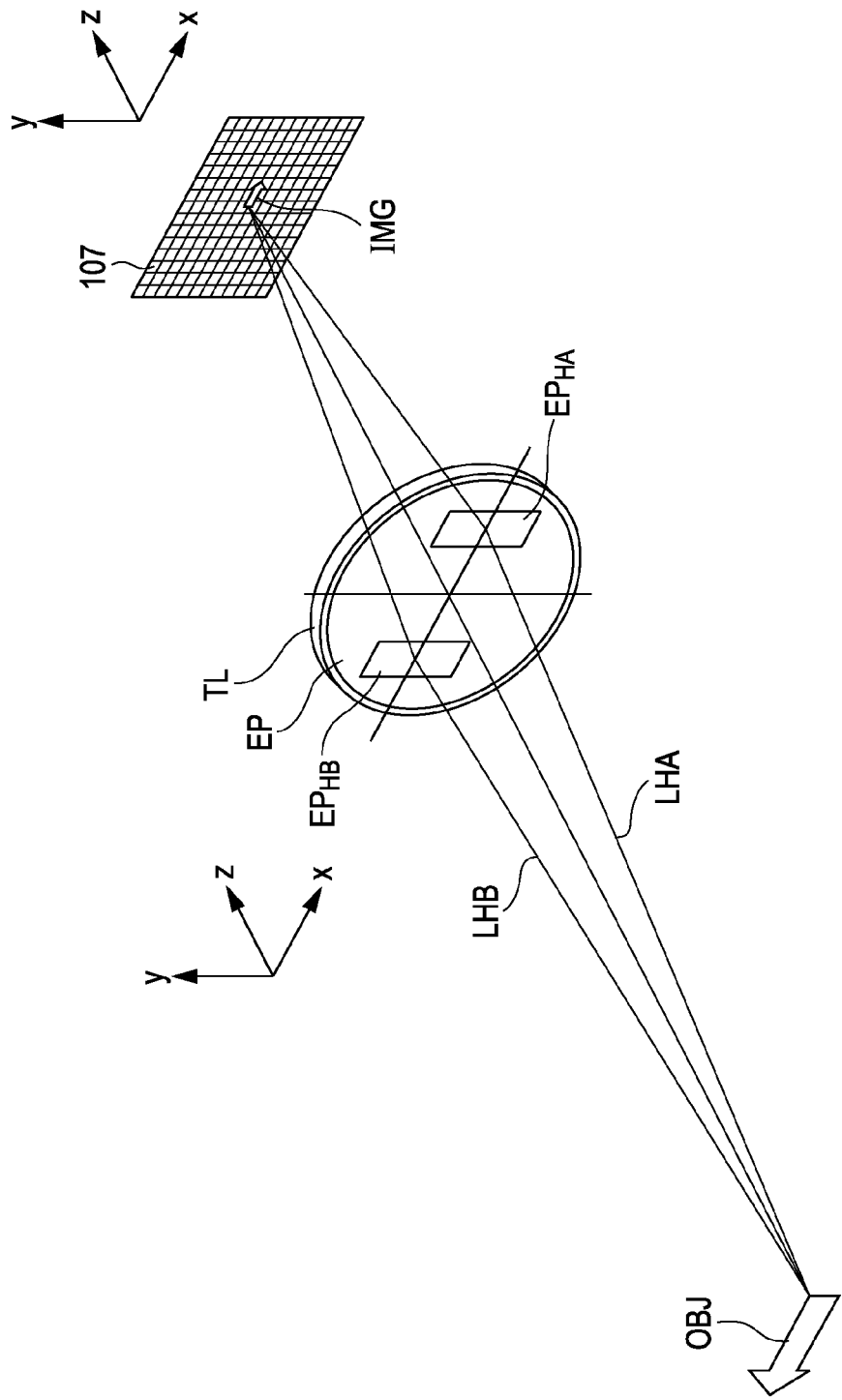
FIG. 4 is a conceptual diagram illustrating the state in which a pupil is divided.

FIG. 4 is a conceptual diagram illustrating the pupil dividing state at the image pickup element according to the present embodiment. Reference sign TL denotes the taking lens, 107 denotes the image pickup element, OBJ denotes an object, and IMG denotes an image signal. As described above with reference to the plan view and the sectional view of the image pickup pixels in the image pickup element illustrated in FIGS. 2A and 2B, each image pickup pixel receives a light beam that passes through the entire exit pupil area EP of the taking lens TL. In contrast, as described above with reference to the plan view and the sectional view of the focus detection pixels for dividing the pupil along the x direction illustrated in FIG. 3, the focus detection pixels have a pupil dividing function. More specifically, the pixel SHA illustrated in FIG. 3A receives a light beam that passes through a pupil area at the +x side, that is, a light beam that passes through a pupil area EPHA in FIG. 4. The focus detection pixels are distributed over the entire area of the image pickup element 107 so that the focus calculation can be performed over the entire image pickup area.

Although the structure for an object having an illumination distribution along the x direction is described above, a structure for an object having an illumination distribution along the y direction can also be obtained by providing a structure similar to the above-described structure along the y direction.

(Pupil Intensity Distribution and Line Spread Function When Vignetting is Not Caused)

The intensity distribution of the light beam in the exit pupil area is hereinafter referred to simply as a pupil intensity distribution.

Figure 5A:
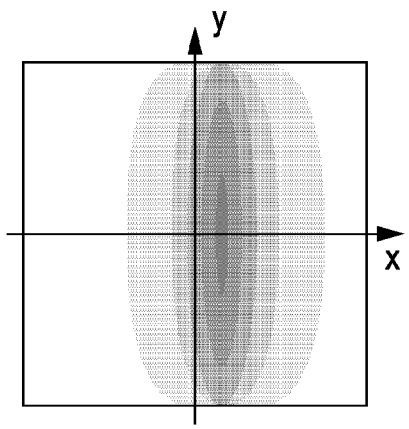
FIGS. 5A to 5C are conceptual diagrams illustrating pupil intensity distributions for the focus detection pixels.
Figure 5B:
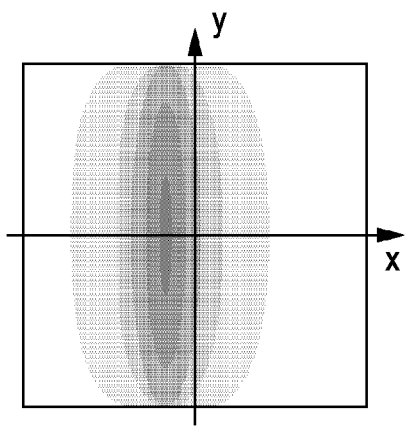
Figure 5C:
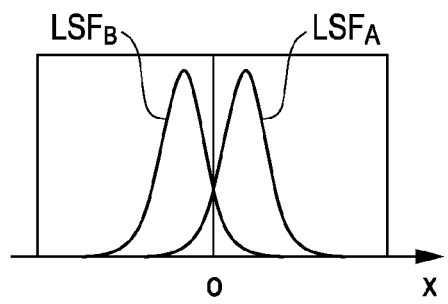

FIGS. 5A to 5C illustrate pupil intensity distributions for the focus detection pixels and line spread functions obtained by the pupil intensity distributions. FIGS. 5A and 5B show the characteristics of the focus detection pixel SHA and the focus detection pixel SHB, respectively. The x-axis and y-axis in FIGS. 5A and 5B correspond to the x-axis and y-axis, respectively, in FIG. 4. Referring to FIGS. 5A to 5C, as the color density increases, the light receiving intensity increases accordingly. In FIG. 3B, the exit pupil area EPHA for the focus detection pixel SHA and the exit pupil area EPHB for the focus detection pixel SHB are illustrated such that they are separated from each other for convenience of explanation. However, as illustrated in FIGS. 5A and 5B, the exit pupil areas for the focus detection pixel SHA and the focus detection pixel SHB somewhat expand and partially overlap due to the influence of diffraction at the openings, that is, at the opening OPHA and the opening OPHB illustrated in FIG. 3B.

FIG. 5C is a diagram illustrating the line spread functions of the focus detection pixels. The line spread functions are projections of the pupil intensity distributions illustrated in FIGS. 5A and 5B in the y direction. The horizontal axis corresponds to the x axis in FIGS. 5A and 5B, and the vertical axis shows the intensity of the line spread functions. The origin O corresponds to the position of the optical axis of the taking lens.

The intensity distribution of a point image formed on an image plane by light emitted from a point source and transmitted through an exit pupil of an optical system is called a point spread function. If the optical system has no aberration, the point spread function is considered to be a reduced projection of the shape of the exit pupil on the image plane. A line spread function is a projection of the point spread function. Therefore, the projections of the pupil intensity distributions are the line spread functions.

As illustrated in FIG. 5C, the line spread functions $LSF_A$ and $LSF_B$ of the focus detection pixels at the central area of the image pickup element are substantially symmetrical to each other (have substantially the same image shape) about the optical axis. In addition, each of the line spread functions $LSF_A$ and $LSF_B$ has a shape that is substantially symmetrical in the x-axis direction about the center of gravity thereof in the x-direction.

(Pupil Intensity Distribution and Line Spread Function When Vignetting is Caused)

Figure 6A:
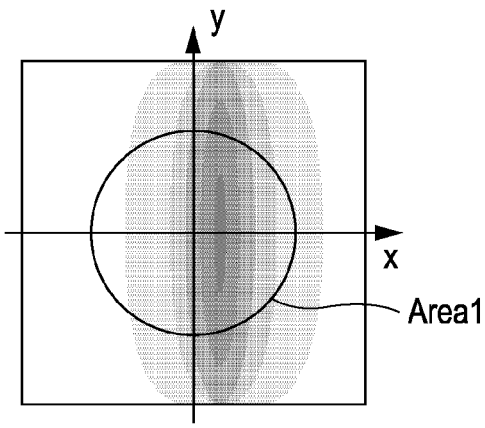
FIGS. 6A to 6C are conceptual diagrams illustrating pupil intensity distributions for the focus detection pixels in a central area of an image pickup element.
Figure 6B:
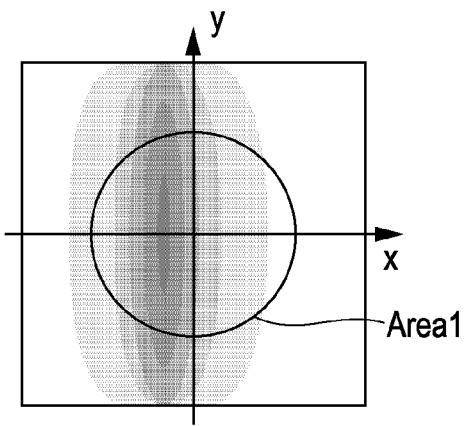
Figure 6C:
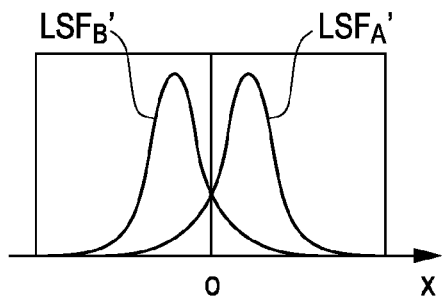

In contrast to the pupil intensity distributions illustrated in FIGS. 5A and 5B, FIGS. 6A and 6B illustrate pupil intensity distributions obtained in the case where vignetting is caused by the taking lens and line spread functions obtained by the pupil intensity distributions. FIGS. 6A and 6B show the characteristics of pupil intensity distributions of the focus detection pixel SHA and the focus detection pixel SHB, respectively, in the case where vignetting is caused by the taking lens. In the pupil intensity distributions for the focus detection pixels SHA and SHB illustrated in FIGS. 6A and 6B, only the areas surrounded by the contours denoted by Area 1 serve as the light receiving areas for the focus detection pixels SHA and SHB. FIG. 6C is a diagram illustrating the line spread functions in the case where vignetting is caused by the taking lens. Similar to FIG. 5C, the line spread functions illustrated in FIG. 6C are projections of the pupil intensity distributions illustrated in FIGS. 6A and 6B in the y direction. The horizontal axis corresponds to the x axis in FIGS. 5A and 5B, and the vertical axis shows the intensity of the line spread functions. The origin O corresponds to the position of the optical axis of the taking lens.

As illustrated in FIG. 6C, similar to FIG. 5C, the line spread functions $LSF_A'$ and $LSF_B'$ of the focus detection pixels at the central area of the image pickup element are substantially symmetrical to each other about the optical axis. However, since the pupil intensity distributions are partially cut off by Area 1 as shown in FIGS. 6A and 6B, each of the line spread functions $LSF_A'$ and $LSF_B'$ has a shape that is asymmetrical in the x-axis direction about the center of gravity thereof in the x-direction.

(Structure for Focus Detection Using Image Pickup Element 107 and Image-Pickup-Element Driving Circuit 124)

Figure 7:
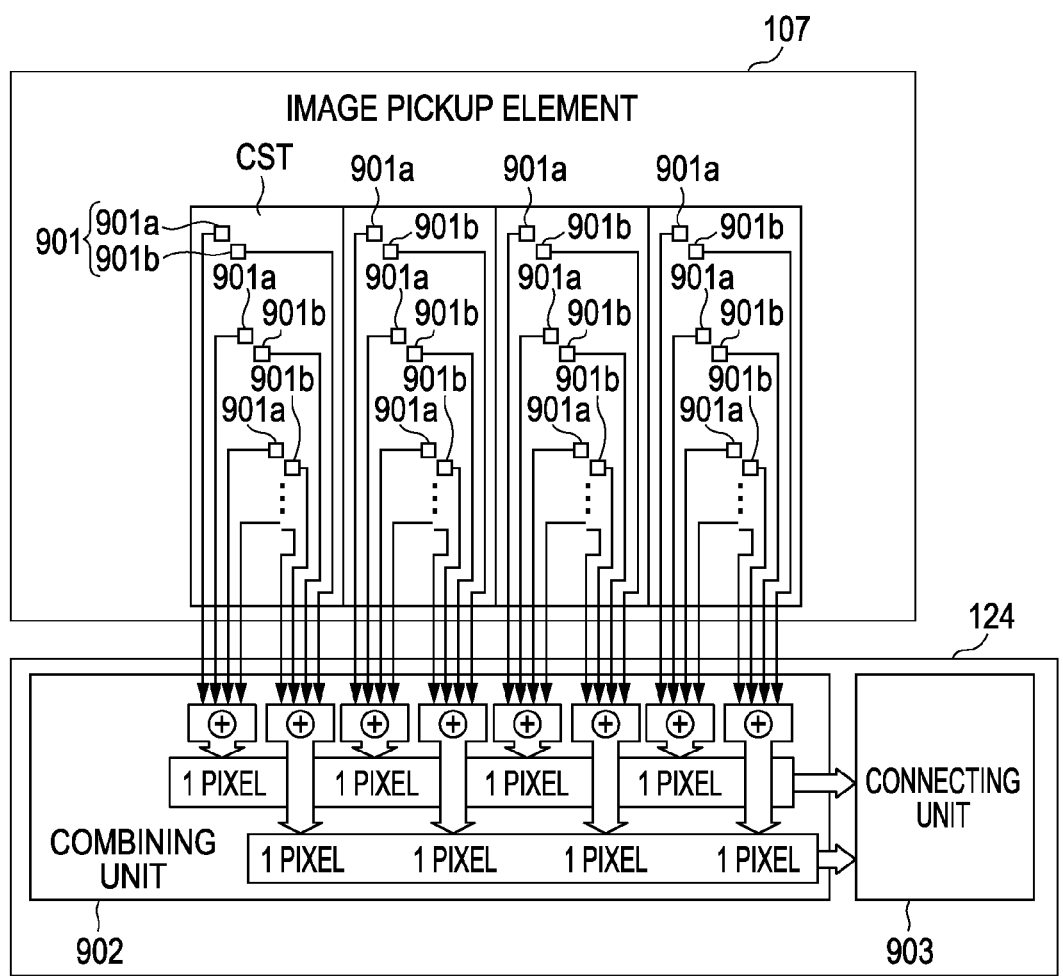
FIG. 7 is a driving circuit diagram of the image pickup element.

FIG. 7 is a schematic diagram illustrating a focus calculation structure including the image pickup element 107 and the image-pickup-element driving circuit 124 illustrated in FIG. 1. In FIG. 7, the A/D converter is omitted to facilitate understanding.

The image pickup element 107 includes a plurality of focus detection pixels 901 including focus detection pixels 901a and focus detection pixels 901b having the structures described above with reference to FIGS. 3A and 3B. The focus detection pixels 901a correspond to the focus detection pixels SHA, and the focus detection pixels 901b correspond to the focus detection pixels SHB. The image pickup element 107 also includes the image pickup pixels for performing photoelectric conversion of an object image formed by the taking lens.

The image-pickup-element driving circuit 124 includes a combining unit 902 and a connecting unit 903. The image-pickup-element driving circuit 124 defines sections (areas) CST on the imaging plane of the image pickup element 107 such that the each section CST includes a plurality of focus detection pixels 901. The image-pickup-element driving circuit 124 can change the size, arrangement, number, etc., of the sections CST as necessary. The combining unit 902 performs a process of obtaining a first combined signal for a single pixel by combining output signals from the focus detection pixels 901a included in each of the sections CST defined in the image pickup element 107. The combining unit 902 also performs a process of obtaining a second combined signal for a single pixel by combining output signals from the focus detection pixels 901b included in each section CST. The connecting unit 903 performs a process of obtaining a first connection signal by adding the first combined signals from the respective sections CST and a process of obtaining a second connection signal by adding the second combined signals from the respective sections CST. Thus, the connection signal obtained by connecting the same number of focus detection pixels as the number of sections is obtained for each of the focus detection pixels 901a and 901b. The amount of defocus of the taking lens is calculated by the CPU 121 on the basis of the first connection signal and the second connection signal. Thus, the output signals from the focus detection pixels arranged in each section that correspond to the same pupil dividing direction are combined together. Therefore, even when the illumination of each focus detection pixel 901 is small, the illumination distribution of the object can be reliably detected.

(Image Signals Output by Image Pickup Element 107)

Figure 8:
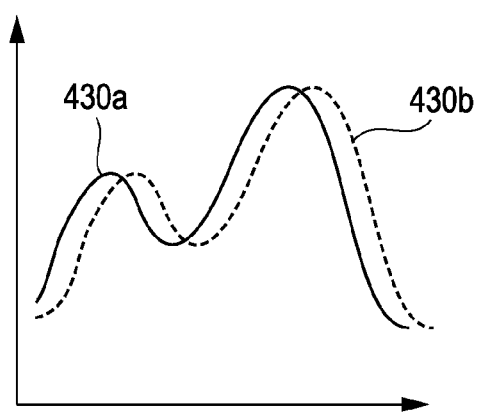
FIG. 8 is a diagram illustrating image signals obtained from the element illustrated in FIG. 7.

FIG. 8 illustrates a pair of image signals formed by the focus detection pixels 901, the combining unit 902, and the connecting unit 903 illustrated in FIG. 7 and transmitted to the CPU 121. In FIG. 8, the horizontal axis shows the direction in which the pixels corresponding to the connected signals are arranged and the vertical axis shows the intensity of the signals. An image signal 430a is a signal formed by the focus detection pixels 901a and an image signal 430b is a signal formed by the focus detection pixels 901b. The focus position of the taking lens is in the defocused state, and therefore the image signal 430a is shifted leftward and the image signal 430b is shifted rightward.

The amount of displacement of the focus position of the taking lens can be determined by performing the correlation calculation based on an amount of image displacement between the image signals 430a and 430b. Accordingly, the focus adjustment can be performed. In the focus calculation operation according to the present embodiment, as described above with reference to FIGS. 6A to 6C, each of the line spread functions has a shape that is asymmetrical about the center of gravity, owing to the vignetting caused by the taking lens. Therefore, each of the image signal A and the image signal B obtained by the focus detection pixels is also asymmetrical. In other words, the degree of coincidence of the images is reduced. In a phase-difference focus detection method, the amount of image displacement cannot be accurately calculated if the degree of coincidence of the images is low (if the images are asymmetric). Therefore, according to the present embodiment, this problem is solved by correcting the asymmetry of the image signals.

(Asymmetry of Image Signals)

The reason why the asymmetry of the image signals occurs and the method for correcting the asymmetry will now be described.

When f(x,y) is the light intensity distribution of the object and g(x,y) is the light intensity distribution of each image signal, the following relationship (convolution integral) is satisfied.

$$g(x, y) = \int_{-\infty}^{\infty} \int_{-\infty}^{\infty} f(x-a, y-b) h(a, b) da db \tag{1}$$

In the above equation, h(a, b) is called a point spread function, which is a transfer function that represents the manner in which the object image is degraded by the image forming system. Therefore, it is necessary to know the point spread function to determine the pair of image signals to be used in the focus calculation. In the focus calculation using the image displacement method, an amount of image displacement in a first-order direction between the pair of image signals is calculated. Therefore, the image system relating to the focus calculation can be evaluated by a line spread function, which is a first-order function, in place of the point spread function, which is a second-order function. Therefore, the light intensity distribution of the object can be replaced by f(x), and the light intensity distribution of each image signal can be replaced by g(x). Accordingly, the above Equation (1) can be rewritten as follows by using a line spread function L(a).

$$g(x) = \int_{-\infty}^{\infty} f(x-a)L(a)da \quad (2)$$

In addition, the relationship between the point spread function and the line spread function can be expressed as Equation (3) given below.

$$L(a) = \int_{-\infty}^{\infty} h(a,b)db \quad (3)$$

As described above, the point spread function is the intensity distribution of a point image formed on an image plane by light emitted from a point source and transmitted through an exit pupil of an optical system, and is considered to be a reduced projection of the shape of the exit pupil on the image plane if the optical system has no aberration. Therefore, the pupil intensity distribution can be substituted for the point spread function h(a,b). In addition, as is clear from Equation (3), the line spread function can be considered as the projection of the pupil intensity distribution. Therefore, in the above description referring to FIGS. 5A to 5C and FIGS. 6A to 6C, the line spread functions are explained as the projections of the pupil intensity distributions. As is clear from Equation (2), according to the present embodiment, the pair of image signals are obtained as convolutions of the object image and the asymmetric line spread functions $LSF_A'$ and $LSF_B'$ described with reference to FIG. 6C. Therefore, the pair of image signals are also asymmetric. As described above, if the image signals used in the correlation calculation are asymmetrical, the accuracy of the focus position calculation is reduced. The accuracy of the focus position calculation can be effectively increased by correcting the asymmetry of the pair of image signals and increasing the degree of coincidence of the images.

(Method for Correcting Asymmetry of Image Signals)

A method for correcting the asymmetry of the image signals will now be described. Referring to FIG. 7, the image signal obtained by the focus detection pixels 901a is called an image signal A, and the image signal obtained by the focus detection pixels 901b is called an image signal B. As described above, the asymmetry of the image signals A and B is caused by the convolution integration of the asymmetrical line spread functions $LSF_A'$ and $LSF_B'$.

Figure 9A:
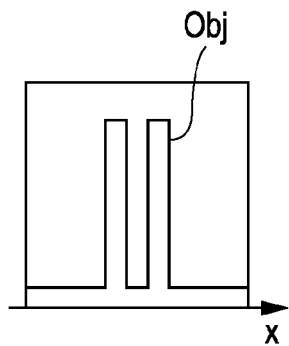
FIGS. 9A to 9G show conceptual diagrams illustrating an image correction filter process.
Figure 9B:
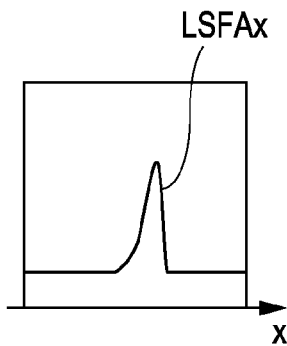
Figure 9C:
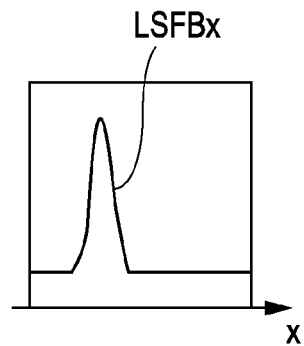
Figure 9D:
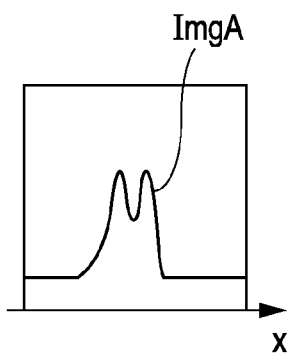
Figure 9E:
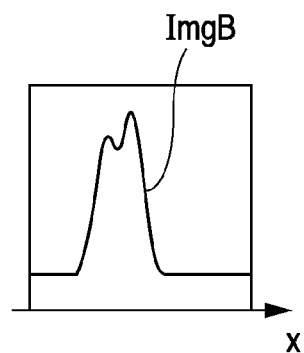
Figure 9F:
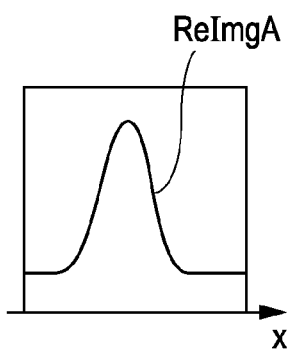
Figure 9G:
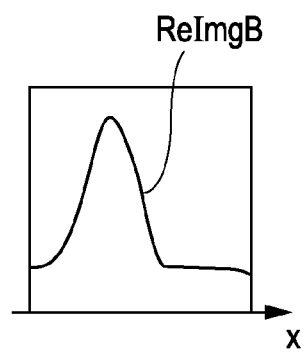

FIGS. 9A to 9G show conceptual diagrams illustrating an image correction filter process performed to eliminate the asymmetry of the image signals. In each diagram shown in FIGS. 9A to 9G, the horizontal axis shows the direction in which the pixels are arranged and the vertical axis shows the intensity of the image signals. FIG. 9A shows a light intensity distribution Obj of the object. FIGS. 9B and 9C show line spread functions LSFAx and LSFBx of the focus detection pixels SHA and SHB, respectively. FIGS. 9D and 9E show the image signal A (ImgA) and the image signal B (ImgB), respectively, obtained by the convolution integration of the light intensity distribution Obj of the object and the line spread functions LSFAx and LSFBx, respectively. FIG. 9F shows a corrected image ReImgA obtained by the convolution integration of the image signal A (ImgA) and the line spread function LSFBx, which serves as an image correction filter, for the image signal B. FIG. 9G shows a corrected image ReImgB obtained by the convolution integration of the image signal B (ImgB) and the line spread function LSFAx, which serves as an image correction filter, for the image signal A. As illustrated in FIGS. 9F and 9G, the corrected images have the same shape. The reason why the corrected images have the same shape will now be described.

The image signal A (ImgA) is calculated by Equation (2) given above. When k(x) is the corrected image ReImgA obtained by the convolution integration of the image signal A (ImgA) and the line spread function LSFBx, k(x) can be calculated as follows.

$$k(x) = \int_{-\infty}^{\infty} g(x-b)L_B(b)db \quad (4)$$
$$= \int_{-\infty}^{\infty}\int_{-\infty}^{\infty} f(x-a-b)L_A(a)da L_B(a)db$$
$$= \int_{-\infty}^{\infty}\int_{-\infty}^{\infty} f(x-a-b)L_A(a)L_B(a)dadb$$

The corrected image ReImgB can be similarly calculated as follows.

$$k(x) = \int_{-\infty}^{\infty}\int_{-\infty}^{\infty} f(x-a-b)L_A(a)L_B(a)dadb \quad (5)$$

As is clear from Equations (4) and (5) given above, ReImgA and ReImgB are equal to each other. Therefore, the amount of image displacement can be calculated by performing the correlation calculation using ReImA and ReImgB.

(Flow of Focus Calculation)

Figure 10:
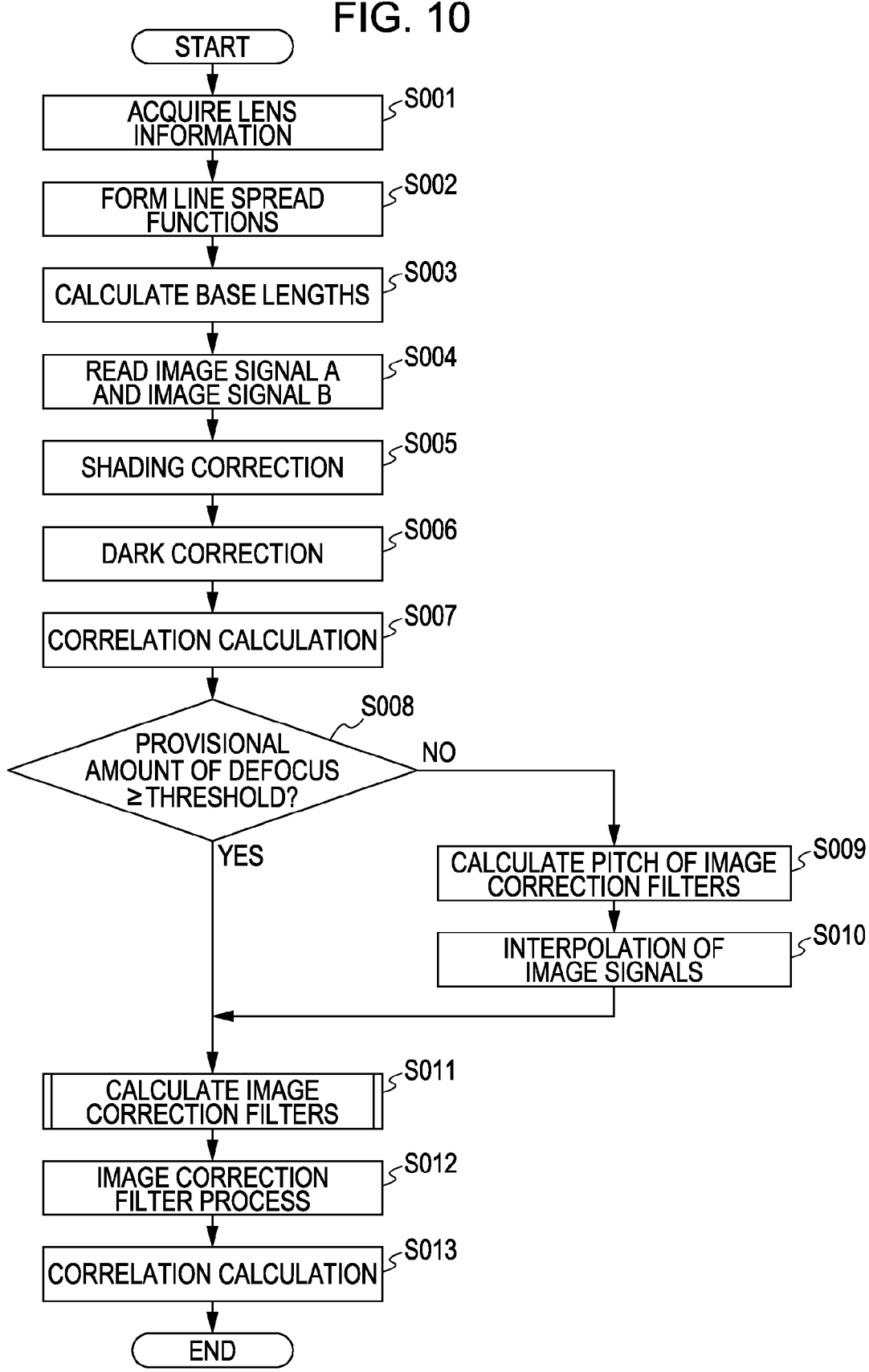
FIG. 10 is a flowchart of a focus calculation process in which a pitch is changed in accordance with an amount of defocus.

A flow of the focus calculation according to the first embodiment will now be described with reference to the flowchart in FIG. 10. The operation of the flowchart in FIG. 10 is performed by the CPU 121.

In step S001, lens information for determining the state of vignetting caused by the taking lens is acquired. In step S002, the pupil intensity distribution stored in the ROM of the CPU 121 is read for each focus detection pixel, and the line spread functions are calculated using the pupil intensity distributions and the information regarding the vignetting caused by the taking lens obtained in step S001.

In step S003, the centers of gravity of the line spread functions obtained in step S002 are calculated to determine the base length. In step S004, image signals from the focus detection pixels at the focus detection position are read, and the image signals A and B are generated. In step S005, shading of the image signals A and B generated in step S004 are estimated using the lens information obtained in step S001 and the pupil intensity distributions, and shading correction is performed.

In step S006, the image signals A and B generated in step S004 are subjected to dark correction using dark values stored in the ROM in the CPU 121. In step S007, the amount of image displacement is determined by the correlation calculation using the image signals A and B after the dark correction obtained in step S006. Then, a provisional amount of defocus is determined from the amount of image displacement and the base length determined in step S003.

In step S008, the CPU 121 determines whether or not the provisional amount of defocus calculated in step S007 is within a preset range defined by a certain threshold. If it is determined that the provisional amount of defocus is larger than or equal to the preset threshold, the process proceeds to step S011 without changing a pitch (sampling pitch of the line spread functions, which are image correction information) of image correction filters. If it is determined that the provisional amount of defocus is smaller than the preset threshold, the process proceeds to step S009 to calculate a new pitch of the image correction filters. Thus, in addition to changing the shapes of the image correction filters, the pitch thereof is also changed in accordance with the provisional amount of defocus. The reason for this will now be described. If the amount of defocus is large, filter lengths are also large and the shapes of the image correction filters can be relatively accurately expressed. Therefore, the asymmetry of the image signals can be reduced by an image correction processor, and the amount of defocus can be accurately calculated. In contrast, if the amount of defocus is small, the filter lengths are also small and the pitch of the image correction filter that is equal to the pitch in the case where the amount of defocus is large would be too large. Therefore, aliasing distortion occurs and the shapes of the line spread functions obtained in step S002 cannot be accurately expressed. As a result, the asymmetry of the image signals cannot be reduced even when the image correction processor is performed, and the amount of defocus cannot be accurately calculated.

For the above-described reason, the pitch of the image correction filters is preferably changed in accordance with the amount of defocus. The pitch of the image signals is also changed accordingly.

Steps S009 and S010 are performed when the provisional amount of defocus calculated in step S007 is smaller than the threshold. In step S009, the pitch of the image correction filters is calculated on the basis of the provisional amount of defocus calculated in step S007.

In step S010, the image signals are subjected to an interpolation process, such as linear interpolation or spline interpolation, in accordance with the pitch of the image correction filters calculated in step S009.

In step S011, the CPU 121 calculates the image correction filters.

In step S012, corrected image signals are obtained by the convolution integration of the image signals and the image correction filters calculated in step S011.

In step S013, similar to step S007, the amount of image displacement is calculated by the correlation calculation using the corrected image signals calculated in step S012. Then, the amount of defocus is obtained from the amount of image displacement and the base length determined in step S003. Thus, the flow of the focus calculation process is ended.

(Determination of Image Correction Filters)

A method for calculating the image correction filters will now be described with reference to FIGS. 11A to 14C. First, a method for determining the width of the image correction filters will be described with reference to FIGS. 11A and 11B.

FIGS. 11A and 11B show light rays that are incident on the image pickup element 107 in defocused states. FIG. 11A shows the light rays in a front focus state, and FIG. 11B shows the light rays in a rear focus state. Reference symbol Zaf denotes a distance between the plane of the image pickup element 107 and a pupil plane Me, Raf denotes the width of Area 1 illustrated in FIGS. 6A and 6B in the x direction, and Def denotes the amount of defocus. As is clear from FIG. 11A, in the front focus state, a line spread function $LSF_{A1}'$ has the width Raf on the pupil plane Me, and the width is reduced to Wf on the plane of the image pickup element 107. Since the image is formed in the front focus state, the line spread function $LSF_{A1}'$ is inverted in the left-right direction. In consideration of the fact that Def is a negative value in the front focus state, the width Wf can be calculated by the following equation.

$$Wf = \left| \frac{Raf \times Def}{Zaf + Def} \right| \quad (6)$$

The width Wf obtained by Equation (6) serves as the width of the line spread function, that is, the width of the image correction filter, in the front focus state. Similarly, in the rear focus state, the width of the line spread function $LSF_{A2}'$ is reduced to Wb on the plane of the image pickup element 107. In the rear focus state, the line spread function $LSF_{A2}'$ is not inverted in the left-right direction. In addition, the width of the line spread function $LSF_{A2}'$, that is, the width Wb of the image correction filter in the rear focus state, is calculated by Equation (6). The above explanation also applies to the line spread function $LSF_B'$, and detailed explanations thereof will thus omitted.

Next, a gain is applied to make an adjustment for making the intensities of the image correction filters constant. The adjustment is performed because the image signals A and B are subjected to shading correction in step S005. The intensities of the image correction filters for the image signals A and B are adjusted to eliminate the difference in intensity between the image signals after the image correction process.

Then, the waveforms of the image correction filters for the image signals A and B are moved such that the centers of gravity thereof coincide with each other. This process is performed to avoid the centers of gravity of the image signals from being moved after the image correction process. Thus, the image correction filter are calculated.

Figure 12:
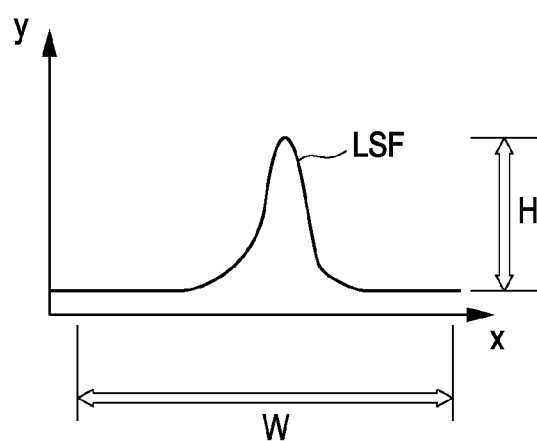
FIG. 12 is a diagram illustrating a line spread function.
Figure 13A:
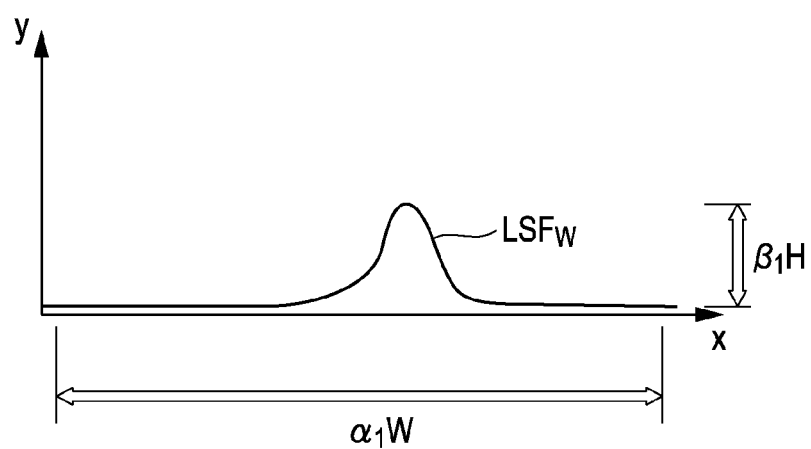
FIGS. 13A and 13B shows conceptual diagrams illustrating a process of obtaining an image correction filter from the line spread function when the amount of defocus is large.
Figure 13B:
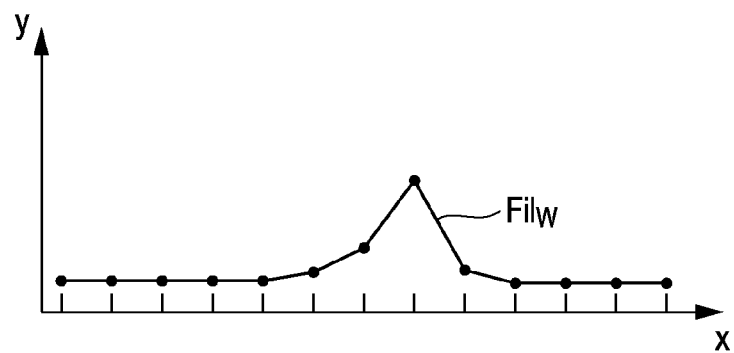
Figure 14A:
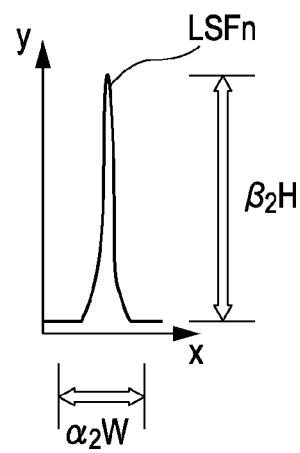
FIGS. 14A to 14C are conceptual diagrams illustrating a process of obtaining the image correction filter from the line spread function when the amount of defocus is small.
Figure 14B:
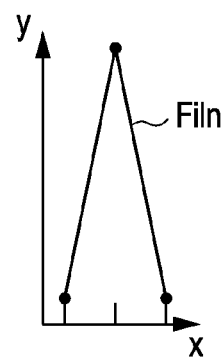
Figure 14C:
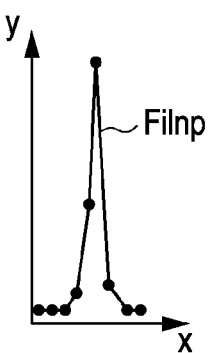

The process of changing the pitch of the filters in accordance with the amount of defocus according to the first embodiment will now be described with reference to FIGS. 12 to 14C. FIGS. 12 to 14C illustrate the manner in which each image correction filter is formed from the corresponding line spread function in accordance with the amount of defocus. FIG. 12 illustrates a line spread function LSF based on which an image correction filter is formed. In FIG. 12, W shows a filter width and H shows a filter intensity. FIGS. 13A and 13B respectively illustrate a line spread function LSFw changed in accordance with a large amount of defocus and an image correction filter Filw obtained by sampling the line spread function LSFw. FIGS. 14A to 14C respectively illustrate a line spread function LSFn changed in accordance with a large amount of defocus, an image correction filter Filn obtained by sampling the line spread function LSFn, and an image correction filter Filnp obtained by sampling the line spread function LSFn with a reduced pitch.

In FIGS. 13A and 13B, which illustrate the case in which the amount of defocus is large, the filter length is large, as in the line spread function LSFw shown in FIG. 13A, and the filter width is α1W. In addition, the height for which the intensity is to be adjusted is β1H. The image correction filter Filw illustrated in FIG. 13B, which is obtained by the sampling process, relatively accurately shows the shape of the line spread function LSFw. In contrast, in FIGS. 14A to 14C, which illustrate the case in which the amount of defocus is small, the filter length is small, as in the line spread function LSFn shown in FIG. 14A, and the filter width is α2W. In addition, the height for which the intensity is to be made constant is β2H. The filter width α2W of the image correction filter Filn illustrated in FIG. 14B, which is obtained by the sampling process, is very small with respect to the pitch of the image correction filter. Therefore, the shape of the line spread function LSFn cannot be accurately expressed. Therefore, the pitch of the image correction filter is reduced as illustrated in FIG. 14C, so that the image correction filter Filnp, which relatively accurately expresses the shape of the line spread function LSFn, can be obtained by the sampling process.

As described above, the filter pitch (that is, the sampling pitch of the image correction information) is changed in accordance with the amount of defocus. Therefore, even when the amount of defocus is small, image correction filters that relatively accurately express the shapes of the line spread functions can be calculated. As described above, according to the first embodiment, the shape and pitch of the image correction filters are changed in accordance with the provisional amount of defocus. Thus, the pitch can be set to the optimum pitch for calculating the amount of defocus.

Since the shape and pitch of the image correction filters are changed in accordance with the provisional amount of defocus, the image signals can be corrected even in an area near the in-focus position.

In addition, since the image signals can be corrected even in an area near the in-focus position, high-accuracy focus adjustment can be performed.

In the first embodiment, the image-displacement method is used for the correlation calculation. However, similar effects can also be obtained when other methods are used.

Second Embodiment

A second embodiment is a modification of the first embodiment.

(Image Correction Filters Corresponding to F-number)

Figure 16:
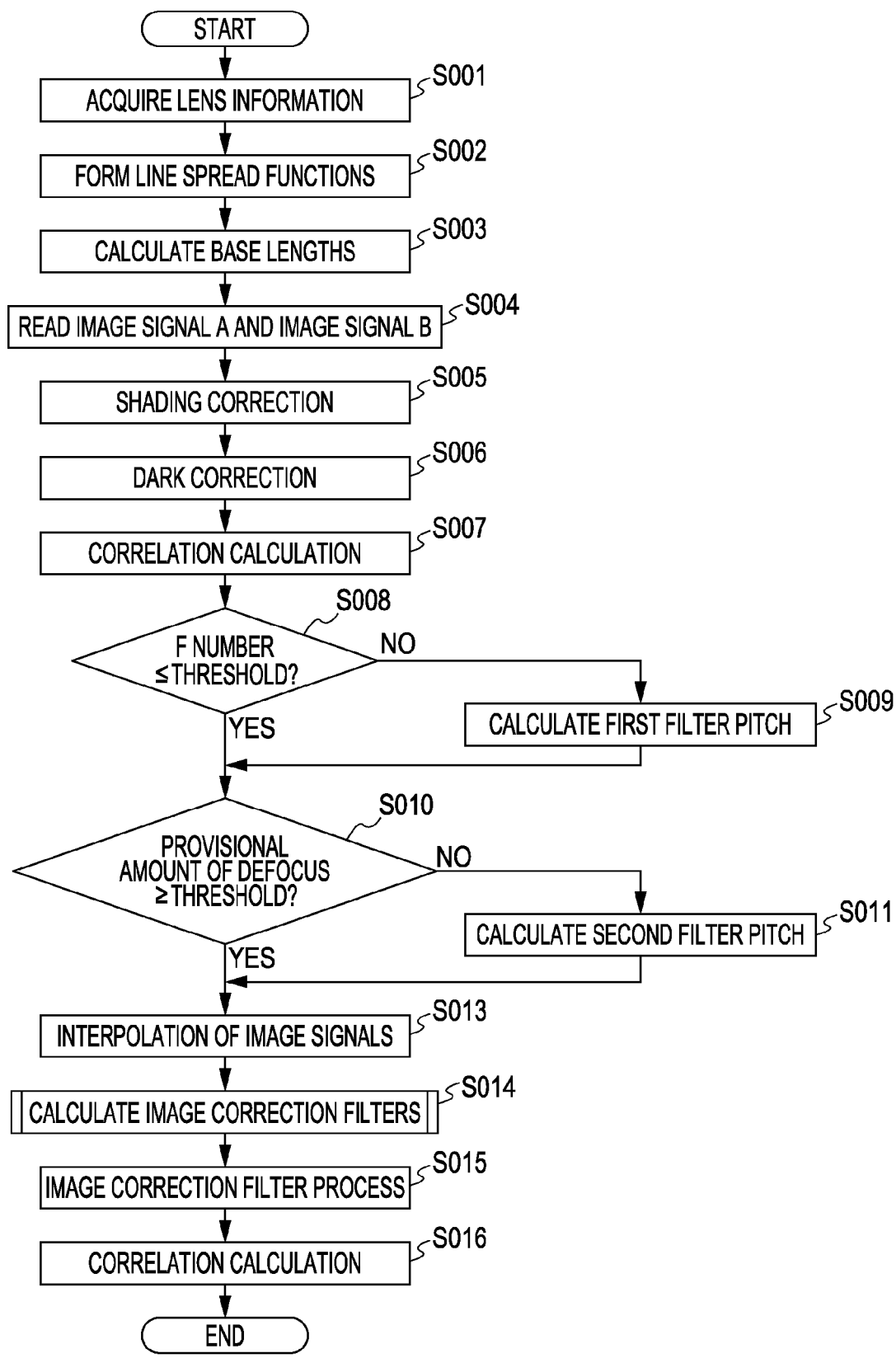
FIG. 16 is a flowchart of a focus calculation process in which a pitch is changed in accordance with an F-number and an amount of defocus.

In the first embodiment, the pitch of the image correction filters is changed in accordance with the amount of defocus. In contrast, the second embodiment is characterized in that the pitch of the image correction filters is also changed in accordance with the F-number of the taking lens. The operation of the flowchart in FIG. 16 is performed by the CPU 121. The focus adjustment process and the shooting process performed in the optical apparatus according to the second embodiment are similar to those in the optical apparatus according to the first embodiment. Therefore, explanations thereof will be omitted.

Figure 15B:
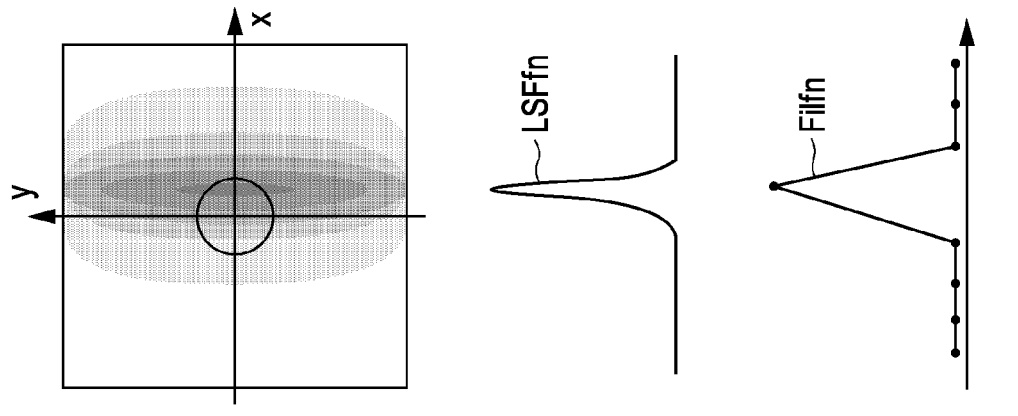
FIGS. 15A and 15B are conceptual diagrams illustrating a process of obtaining image correction filters from the line spread functions corresponding to different F-numbers.
Figure 15A:
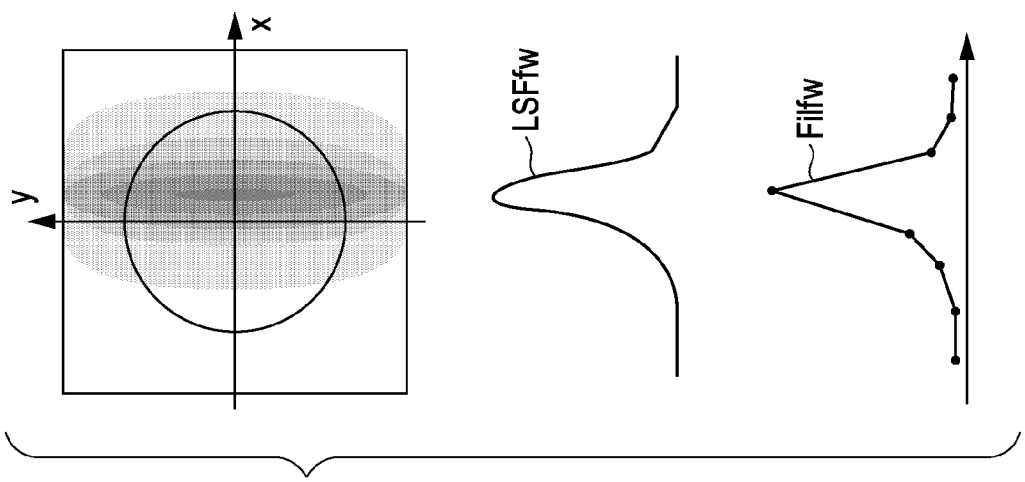

FIGS. 15A, 15B, and 16 are diagrams illustrating the present embodiment, that is, the second embodiment. FIGS. 15A and 15B illustrate the manner in which each image correction filter is formed from the corresponding line spread function in accordance with the F-number. FIG. 16 is a flowchart obtained by adding a process of changing the pitch in accordance with the F-number to the flowchart in FIG. 10.

FIGS. 15A and 15B show the vignettings caused by the taking lens on the pupil plane for the focus detection pixels in accordance with the F-number. FIGS. 15A and 15B show diagrams illustrating the vignettings, line spread functions LSFfw and LSFfn, and image correction filters Filfw and Filfn in that order from the top. More specifically, the diagrams at the top illustrate the vignettings caused by the taking lens in the pupil intensity distributions of the incident light beam on the pupil plane for the focus detection pixels at a central area of the image pickup element. The diagrams at the center illustrate the line spread functions LSFfw and LSFfn obtained by the pupil intensity distributions. The diagrams at the bottom illustrate the image correction filters Filfw and Filfn obtained by sampling the line spread functions. As illustrated in FIG. 15A, when the F-number for the shooting operation is small, the image correction filter Filfw accurately expresses the asymmetric shape of the line spread function LSFfw. In contrast, as illustrated in FIG. 15B, when the F-number for the shooting operation is large, the line image is formed by a light beam that passes through a smaller area in the pupil intensity distribution. Therefore, the pitch that is equal to that in the case where the F-number is small, as illustrated in FIG. 15A, would be too large and the shape of the line spread function LSFfn cannot be accurately expressed by the image correction filter Filfn.

In light of the above-described two points, the pitch of the image correction filters is preferably changed in accordance with the F-number. The pitch of the image signals is also changed accordingly.

A flow of the focus calculation according to the second embodiment will now be described with reference to the flowchart in FIG. 16.

Steps S001 to S007 are similar to those in the first embodiment described above with reference to FIG. 10. Therefore, the explanations thereof will be omitted.

In step S008, the CPU 121 determines whether or not the F-number for the shooting operation obtained in step S001 is within a preset range. If it is determined that the F-number for the shooting operation is smaller than or equal to a preset threshold, the process proceeds to step S010. If it is determined that the F-number for the shooting operation is larger than the preset threshold, the process proceeds to step S009 to calculate a pitch of the image correction filters. Thus, the pitch of the image correction filters is switched in accordance with the F-number for the shooting operation.

In step S009, a first filter pitch (that is, sampling pitch of the image correction information) is calculated on the basis of the F-number for the shooting operation obtained in step S001.

In step S010, similar to the first embodiment, it is determined whether or not the pitch of the image correction filters is to be switched depending on the provisional amount of defocus calculated in step S007.

Step S011 is performed when the provisional amount of defocus calculated in step S007 is smaller than the threshold. In step S010, a second filter pitch is calculated on the basis of the provisional amount of defocus calculated in step S007.

In step S012, the pitch of the image correction filters is determined.

More specifically, if it is determined that the F-number is larger than or equal to the threshold in step S008 and it is also determined that the provisional amount of defocus is larger than or equal to the threshold in step S010, a predetermined pitch is determined as the pitch of the image correction filters.

If it is determined that the F-number is larger than the threshold in step S008 and it is also determined that the provisional amount of defocus is larger than or equal to the threshold in step S010, the first filter pitch calculated in step S009 is determined as the pitch of the image correction filters.

If it is determined that the F-number is smaller than or equal to the threshold in step S008 and it is also determined that the provisional amount of defocus is smaller than the threshold in step S010, the second filter pitch calculated in step S011 is determined as the pitch of the image correction filters.

If it is determined that the F-number is larger than the threshold in step S008 and it is also determined that the provisional amount of defocus is smaller than the threshold in step S010, a small pitch is determined as the pitch of the image correction filters. The small pitch is the smaller one of the first filter pitch calculated in step S009 and the second filter pitch calculated in step S011.

In step S013, the image signals are subjected to an interpolation process, such as linear interpolation or spline interpolation, in accordance with the pitch of the image correction filters calculated in step S012.

In step S014, the image correction filters are calculated using the pitch of the image correction filters determined in step S012. Then, similar to the first embodiment, the image correction filter process is performed in step S015, and the amount of defocus is determined in step S016 on the basis of the amount of image displacement obtained by the correlation calculation and the base length determined in step S003. Thus, the flow of the focus calculation process is ended.

As described above, according to the second embodiment, the shape and pitch of the image correction filters are changed in accordance with the F-number. Thus, the pitch can be set to the optimum pitch for calculating the amount of defocus.

Since the shape and pitch of the image correction filters are changed in accordance with the F-number, the image signals can be corrected even in an area near the in-focus position.

In addition, since the image signals can be corrected even in an area near the in-focus position, high-accuracy focus adjustment can be performed.

In the second embodiment, the image-displacement method is used for the correlation calculation. However, similar effects can also be obtained when other methods are used.

Other Embodiments

The present invention can also be carried out by the following process. That is, a software (program) that realizes the functions of the above-described embodiments may be supplied to a system or an apparatus via a network or from various storage media, and be read out and executed by a computer (or CPU, MPU, etc.) included in the system or the apparatus.

According to the present invention, the focus adjustment accuracy can be increased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/067742, filed Oct. 13, 2009, which is hereby incorporated by reference herein in its entirety.

REFERENCE SIGNS LIST

| | |
|---|---|
| 107 | image pickup element |
| 121 | CPU |
| 124 | image-pickup-element driving circuit |
| 125 | image processing circuit |
| TL | taking lens |
| OBJ | object |
| IMG | image signal |
| EP | exit pupil |
| EPHA, EPHB | divided exit pupil area |
| SHA, SHB | focus detection pixel |
| ML | on-chip microlens |
| CL | wiring layer |
| OPHA, OPHB | pixel opening |
| 430a, 430b | image signal |
| LSFw, LSFn, LSFA, LSFB | line spread function |
| Filw, Filn, Filfw, Filfn | image correction filter |

What is claimed is:

1. An apparatus comprising:
   image pickup unit that includes a first pixel group and a second pixel group, the first pixel group receiving a light beam that passes through a first pupil area of an optical system that forms an object image and the second pixel group receiving a light beam that passes through a second pupil area;
   correcting unit that corrects a first signal based on an output signal from the first pixel group and a second signal based on an output signal from the second pixel group using correction information with a sampling pitch corresponding to an amount of defocus determined by an amount of relative image displacement between the first signal and the second signal, the sampling pitch being changed when the determined amount of defocus is smaller than a preset threshold; and
   focus adjusting unit that adjusts a focal state of the optical system based on an amount of defocus determined by an amount of relative displacement between a corrected first signal and a corrected second signal obtained as a result of the correction.

2. The according to claim 1, wherein, in the correcting unit, the sampling pitch for the correction information is smaller in a case where the amount of defocus is a second amount of defocus than in a case where the amount of defocus is a first amount of defocus, the second amount of defocus being smaller than the first amount of defocus.

3. The apparatus according to claim 1, wherein the correction information includes a line spread function corresponding to the amount of defocus, and
   wherein the corrected first signal is generated by convolution integration of the first signal obtained by the first pixel group and a second line spread function corresponding to the second pupil area, and the corrected second signal is generated by convolution integration of the second signal obtained by the second pixel group and a first line spread function corresponding to the first pupil area.

4. The apparatus according to claim 1, wherein the correction information is calculated based on vignetting information of the optical system and information of a pupil intensity distribution.

5. The apparatus according to claim 1, wherein the correction information is information for increasing a degree of coincidence of images.

6. The apparatus according to claim 1, wherein, in the correcting unit, the sampling pitch for the correction information is smaller in a case where an F-number of a taking lens is a second value than in a case where the F-number of the taking lens is a first value, the second value being larger than the first value.

7. A method for an apparatus including image pickup unit that includes a first pixel group and a second pixel group, the first pixel group receiving a light beam that passes through a first pupil area of an optical system that forms an object image and the second pixel group receiving a light beam that passes through a second pupil area, the method comprising:
   correcting a first signal based on an output signal from the first pixel group and a second signal based on an output signal from the second pixel group using correction information with a sampling pitch corresponding to an amount of defocus determined by an amount of relative image displacement between the first signal and the second signal, the sampling pitch being changed when the determined amount of defocus is smaller than a preset threshold; and performing a control for adjusting a focal state of the optical system based on an amount of defocus determined by an amount of relative displacement between a corrected first signal and a corrected second signal obtained as a result of the correction.

8. The method to claim 7, wherein, the sampling pitch for the correction information is smaller in a case where the amount of defocus is a second amount of defocus than in a case where the amount of defocus is a first amount of defocus, the second amount of defocus being smaller than the first amount of defocus.

9. The method according to claim 7, further comprising:
generating the corrected first signal by convolution integration of the first signal obtained by the first pixel group and a second line spread function corresponding to the second pupil area; and
generating the corrected second signal by convolution integration of the second signal obtained by the second pixel group and a first line spread function corresponding to the first pupil area, wherein
the correction information includes a line spread function corresponding to the amount of defocus.

10. The method according to claim 7, wherein the calculating correction information is based on vignetting information of the optical system and information of a pupil intensity distribution.

11. The method according to claim 7, wherein the correction information is information for increasing a degree of coincidence of images.

12. The method according to claim 7, wherein, in the correcting unit, the sampling pitch for the correction information is smaller in a case where an F-number of a taking lens is a second value than in a case where the F-number of the taking lens is a first value, the second value being larger than the first value.

13. A non-transitory computer readable storage medium storing a program of instructions for causing a computer to perform the method according to claim 7.

14. The storage medium according to claim 13, wherein, the sampling pitch for the correction information is smaller in a case where the amount of defocus is a second amount of defocus than in a case where the amount of defocus is a first amount of defocus, the second amount of defocus being smaller than the first amount of defocus.

15. The storage medium according to claim 13, wherein the method further comprises:
generating the corrected first signal by convolution integration of the first signal obtained by the first pixel group and a second line spread function corresponding to the second pupil area; and
generating the corrected second signal by convolution integration of the second signal obtained by the second pixel group and a first line spread function corresponding to the first pupil area, and wherein
the correction information includes a line spread function corresponding to the amount of defocus.

16. The storage medium according to claim 13, wherein the calculating correction information is based on vignetting information of the optical system and information of a pupil intensity distribution.

17. The storage medium according to claim 13, wherein the correction information is information for increasing a degree of coincidence of images.

18. The storage medium according to claim 7, wherein, in the correcting unit, the sampling pitch for the correction information is smaller in a case where an F-number of a taking lens is a second value than in a case where the F-number of the taking lens is a first value, the second value being larger than the first value.

* * * * *